(12) United States Patent
Kwong et al.

(10) Patent No.: US 8,995,707 B2
(45) Date of Patent: Mar. 31, 2015

(54) IMAGE ANALYSIS SYSTEM AND/OR METHOD

(75) Inventors: Jeffrey Ng Sing Kwong, London (GB); Alistair Richard Fielder, London (GB); Clare Margaret Wilson, London (GB)

(73) Assignee: UCL Business PLC, London (GB)

( * ) Notice: Subject to any disclaimer, the term of this patent is extended or adjusted under 35 U.S.C. 154(b) by 372 days.

(21) Appl. No.: 13/011,211

(22) Filed: Jan. 21, 2011

(65) Prior Publication Data

US 2011/0206264 A1 Aug. 25, 2011

Related U.S. Application Data

(63) Continuation of application No. PCT/GB2009/001822, filed on Jul. 22, 2009.

(30) Foreign Application Priority Data

Jul. 22, 2008 (GB) .................................. 0813406.6

(51) Int. Cl.
*G06K 9/00* (2006.01)
*G06T 7/60* (2006.01)

(52) U.S. Cl.
CPC ....... *G06T 7/606* (2013.01); *G06T 2207/30041* (2013.01); *G06T 2207/30101* (2013.01)
USPC ............................ 382/100; 345/90; 348/333.1

(58) Field of Classification Search
CPC ..................... G06T 7/606; G06T 2207/30101; G06T 2207/30041
USPC ......... 382/100, 103, 104, 115, 118, 193, 173, 382/128–135; 345/90, 473, 707, 705, 709; 340/541, 542; 707/1; 348/333.1, 348/333.11, 333.12, 222.1, 345, 347
See application file for complete search history.

(56) References Cited

U.S. PATENT DOCUMENTS

| | | | | |
|---|---|---|---|---|
| 5,844,658 | A * | 12/1998 | Kishida et al. | 351/206 |
| 6,621,917 | B1 * | 9/2003 | Vilser | 382/128 |
| 7,324,210 | B2 * | 1/2008 | De Groot et al. | 356/497 |
| 2003/0103212 | A1 * | 6/2003 | Westphal et al. | 356/479 |
| 2004/0015075 | A1 * | 1/2004 | Kimchy et al. | 600/424 |
| 2007/0091318 | A1 * | 4/2007 | Freishlad et al. | 356/511 |
| 2010/0189320 | A1 * | 7/2010 | Dewaele | 382/128 |
| 2010/0191541 | A1 * | 7/2010 | Prokoski | 705/2 |

(Continued)

OTHER PUBLICATIONS

Bharath A A et al.,"A Steerable Complex Wavelet Construction and Its Application 18,20-21 to Image Denoising" IEEE Transactions on Image Processing, IEEE Service Center, Piscataway, NJ, US, vol. 14, No. 7, Jul. 1, 2005,pp. 948-959.

(Continued)

*Primary Examiner* — Hadi Akhavannik
(74) *Attorney, Agent, or Firm* — Cooper Legal Group, LLC (57) ABSTRACT

Among other things, a method is disclosed comprising: receiving image data representing an image; processing the data to generate orientation information; processing the data using the orientation information to measure a quantity called local phase in a direction perpendicular to the orientation of a putative vessel; using the phase measurements from three collinear image locations or from two locations to detect the centerline of a symmetric image structure, such as a blood vessel, and to locate a center-point defined by the intersection of the centerline with the line created by the measurement locations.

21 Claims, 9 Drawing Sheets

(56) References Cited

U.S. PATENT DOCUMENTS

2010/0226533 A1 9/2010 Bharath et al.
2011/0044524 A1* 2/2011 Wang et al. ............... 382/131

OTHER PUBLICATIONS

Folsom T C et al., "Primitive Features by Steering, Quadrature, and Scale" IEEE Transactions on Pattern Analysis and Machine Intelligence, IEEE Service Center, Los Alamitos, CA, US, vol. 20, No. 11, Nov. 1, 1998, pp. 1161-1173.

Kovesi P: "Image features from phase congruency" Videre: Journal of Computer Vision Research, Massachusetts Institute of Technology, US, vol. 1, No. 3, Jun. 21, 1999, pp. 2-26.

Veit U B Schenk et al., "Improving Phase-Congruency Based Feature Detection through Automatic Scale-Selection" Lecture Notes in Computer Science, Springer Verlag, Berlin; DE, vol. 2905, Jan. 1, 2003, pp. 121-128.

Wiskott L et al.,"Face Recognition by Elastic Bunch Graph Matching" IEEE Transactions on Pattern Analysis and Machine Intelligence, IEEE Service Center, Los Alamitos, CA, US, vol. 19, No. 7, Jul. 1, 1997, pp. 775-779.

Reisfeld D:"The Constrained Phase Congruency Feature Detector: Simultaneous Localization, Classification and Scale Determination" Sep. 16, 1996, Pattern Recognition Letters, Elsevier, Amsterdam, NL, pp. 1161-1169.

International Search Report in related PCT application No. PCT/GB2009/001822 dated Nov. 25, 2009.

Freeman; et al., "The Design and Use of Steerable Filters", IEEE Transactions on Pattern Analysis and Machine Intelligence, 13(9): 891-906, Sep. 1991.

* cited by examiner

IMAGE ANALYSIS SYSTEM AND/OR METHOD

RELATED APPLICATIONS

This application is a continuation of PCT/GB2009/001822 filed Jul. 22, 2009, which claims benefit of United Kingdom application no. 0813406.6, filed Jul. 22, 2008, the entirety of which are hereby incorporated by reference herein.

FIELD

This disclosure relates, in general, to systems and/or methods for automated image analysis. In an illustrative embodiment, the present disclosure relates to systems and/or methods for analyzing images, for example ocular fundus images, to automatically detect image components that are representative of blood vessels and retinal pathology in the fundus. One embodiment may also provide for the quantification of any detected image components.

BACKGROUND

Ocular imaging of the fundus provides clinicians with a unique opportunity to non-invasively study the internal system of blood vessels that provide for retinal circulation within the eye. Conveniently, analysis of such ocular images provides a good way for clinicians to monitor retinal pathologies that threaten sight as well as conditions, such as diabetes and hypertension, for example, which generally affect circulation through blood vessels in the body.

In general terms, various pathological conditions tend to be associated with changes in the morphological and geometrical characteristics of blood vessels, such as increases in width (caliber) and tortuosity during congestion, within the eye. Pathological conditions also tend to be associated with blob-like structures such as hemorrhages and exudates. Examination of retinal images is predominantly carried out qualitatively by clinicians, and it is generally true to say that the process of retinal image analysis is extremely time-consuming. A further drawback is that conventional analytical techniques are generally highly subjective—that is to say that it is not unusual for different clinicians to derive different information from the same ocular image.

In the context of retinopathy of preterm infants, there is a window of opportunity for treatment that is in the region of twenty-two to seventy-two hours, and in this context in particular and indeed more generally it would be advantageous if the process of analyzing retinal images could be automated to provide accurate, repeatable and fast ocular analysis, in particular insofar as measurements of ocular blood vessels are concerned.

SUMMARY

Aspects of the present application address the above matters and others. According to one embodiment a method comprising: receiving image data representing an image; processing data to generate orientation information; processing the data using the orientation information to measure a quantity called local phase in a direction perpendicular to the orientation of a putative vessel; using the phase measurements from three collinear image locations or from two locations to detect the centerline of a symmetric image structure, such as a blood vessel, and to locate the intersection of the centerline with the line created by the measurement locations, henceforth called a center-point is provided.

More generally, one embodiment comprises a method for automatically analyzing images for image components of interest (for example, a series of image components representative of a retinal blood vessel), the method comprising: processing image data to determine orientation information for image components; obtaining data representative of local phase in a direction perpendicular to the orientation of said image components; and utilizing phase measurements from a plurality of candidate image locations to identify an image component of interest.

In one embodiment, characteristics (e.g., morphological characteristics such as width) of image components of interest—such as a blood vessel—can be determined, for example by fitting models of the phase characteristics of a known vessel profile to the phase measurements.

In one implementation, image measurements extracted by image processing filters such as orientation, phase and contrast, for example, are measured over multiple scales (e.g., multiple filter sizes) at the same location. In one aspect, the center-points and morphological measurements from substantially all scales can be used. In another aspect, the center-points and morphological measurements at the scale with the highest isotropic contrast, highest directional contrast perpendicular to the orientation of the vessel, either unnormalized or normalized to the total contrast of the directional measurements in the filter bank can be used.

The center-points with below a threshold difference in measured width, orientation, and/or contrast are linked together so that the vessel network of the retina can be traced.

Another embodiment relates to an apparatus configured to automatically implement the method herein described. Yet another embodiment relates to a computer program comprising one or more computer program elements that are configured, when executed, to implement one or more of the acts of the method(s) herein described.

According to another aspect there is provided a method of analyzing images comprising: processing an image with at least one filter to produce at least one intermediate data structure; measuring local phase from the at least one intermediate data structure; and analyzing a plurality of measurements of local phase in order to identify an image component of interest.

By analyzing local phase it may be possible to identify image components that were not detectable using previously known methods. This may allow the automatic identification of features such as thin blood vessels in an image of the fundus of the eye, for example.

The act of processing the image may comprise convolving the image with the filter to produce the intermediate data structure. Thus, the intermediate data structure may be a convolved image. In one embodiment the image is convolved with the filter linearly.

The filter may be a single complex filter. Thus, the intermediate data structure may comprise a real portion and an imaginary portion.

The act of processing the image may comprise processing the image with a plurality of filters to produce a plurality of intermediate data structures. In this way, the image may be processed separately with respective filters.

The act of processing the image may comprise convolving the image with two filters so that respective convolutions produce an intermediate data structure. The local phase may be measured according to data in respective intermediate data structures.

The at least one filter may comprise an edge filter component and a ridge filter component. There may be a single filter with a real filter component and an imaginary filter component, which may be the edge filter and the ridge filter respectively. Alternatively the image may be processed with two real filters, one of which is a ridge filter and one of which is an edge filter.

A ridge filter may be a filter that provides a strong response when convolved with an image having a structure with ridge-like properties (e.g., a thin line with an intensity contrast to its surroundings). The ridge filter may have an angular aspect, which may also be referred to as the filter angle. For example, the structure of the filter may be aligned in a particular direction.

An edge filter may be a filter that provides a strong response when convolved with an image having a structure with an edge (e.g., an area with an intensity contrast defining the boundary of the area). The edge filter may have an angular aspect, or filter angle. For example, the structure of the filter may be aligned in a particular direction.

In one embodiment, the local phase is determined based on the values of b and a, wherein b and a are components of the at least one intermediate data structure. For example, the local phase may be determined based on the relative values of b and a. In one example, the local phase is determined using the expression $\tan^{-1}(b/a)$.

Where the image is convolved with two filters respectively, there may be an intermediate data structure for respective convolved images. The local phase may be measured at respective points in the image using the expression $\tan^{-1}(b/a)$ where a is the magnitude of one of the intermediate data structures at a particular point, and b is the magnitude of the other intermediate data structure at the same point. In one example, b is the magnitude of the intermediate data structure produced by convolving the image with a ridge filter and a is the magnitude of the intermediate data structure produced by convolving the image with an edge filter.

The same effect may be achieved by convolving the image with a single complex filter. In these circumstances b may be the complex component of the intermediate data structure and a may be the real component of the intermediate data structure. Thus, the local phase may be viewed as the angle of a complex number as represented in an Argand diagram.

In one embodiment, the method further comprises processing the image to generate orientation information about a candidate image component of interest. Further, the orientation information may be generated by processing the image with a plurality of different filters, respectively having different angular aspects.

An image component may produce a strong response when it is processed with a filter having a particular angular aspect. For example, an image comprising a blood vessel may produce a strong response when linearly convolved with a ridge filter or an edge filter that is aligned substantially perpendicularly to the blood vessel. Thus, it may be possible to identify the orientation of blood vessels having a low contrast to the background by identifying the filter angle that provides the strongest response in a convolved image; such blood vessels may not even be immediately evident on casual inspection of an image.

In one example, the image is processed with four filters that are arranged in quadrature so that the angular aspects of respective filters are separated by 45°. Rather than assuming that the orientation of the candidate image component corresponds with the angle of the filter that yields the strongest response, the orientation may be determined more precisely by interpolating between the responses of the filters, for example.

Of course, better results may be obtained through the use of more filters (for example 8 filters with angular aspects separated by 22.5°, or 180 filters with angular aspects separated by 1°).

It may also be possible to determine orientation information by processing the image with a steerable filter (the angular aspect of which can be tuned). In this way, the orientation of the image structure may be determined roughly (for example, using four filters in quadrature) and then precisely in an iterative fashion using a steerable filter.

Of course, orientation information could also be generated in a more conventional way by directly analyzing the intensity of the image. Using this method it may be possible merely to identify the orientation of blood vessels that have a high contrast to the background.

The image may be processed with at least one filter to produce at least one intermediate data structure having properties that are representative of processing with a filter having an angular aspect that is substantially perpendicular to the orientation of the candidate image component.

Thus, the image may be convolved with an edge filter and a ridge filter that are specially aligned to be perpendicular to the orientation of the candidate image component. This may be achieved by providing a steerable edge filter and a steerable ridge filter, for example.

In another embodiment it may be possible to convolve the image with a plurality of edge and ridge filters having fixed angular aspects. The effect of convolving the image with filters having a specific angular aspect may then be recreated by interpolating between the results achieved with the fixed filters, for example.

The plurality of measurements of local phase may define a path that is substantially perpendicular to the orientation of the candidate image component of interest.

Although the local phase is measured from the intermediate data structure, the measurements may correspond to locations in the image. By analyzing the local phase along a cross-section of a candidate image component it may be possible to identify features of the image component.

In one embodiment, there are at least three collinear measurements of local phase, which, in one example, may be the minimum number of phase measurements that is required so that an image component can be identified.

A property of the image component of interest may be identified by determining at least one characteristic of the local phase along the path that is substantially perpendicular to the orientation of the candidate image component. Examples of characteristics of the local phase may include discontinuities, maxima, minima, and zero-points (x-axis intersections). In one example, the center-point of an image component of interest may be identifiable by virtue of a discontinuity in the phase along the path.

A property of the image component of interest may be determined by fitting the measurements of local phase along the path to predicted measurements of local phase for known structures. In this way, it may be possible to determine the width of a blood vessel by comparing features of the measurements of the local phase to expected measurements of local phase for particular blood vessel widths, for example.

The act of processing the image may comprise processing the image with a plurality of filters having different dimensions to produce a plurality of intermediate data structures so that a plurality of measurements of local phase can be determined for respective filter dimensions.

Plots of the local phase in a path that is perpendicular to a candidate image component may appear different, depending on the dimensions of the filter used in the processing of the image. However, the plots of local phase may comprise some consistent properties. In particular, for respective filter dimensions the phase may undergo a discontinuity at a location coinciding with the center of the image component of interest. Alternatively the phase may have a specific value such as zero at a location coinciding with the center of the image component of interest.

By matching up discontinuities in the phase as determined using filters of different dimensions it may be possible to identify the center of an image component with certainty, for example.

The dimensions of a filter may comprise the shape of the filter, its size relative to the image, and its magnitude relative to the image.

The method may also comprise matching a characteristic of the plurality of measurements of local phase determined for respective filter scales in order to identify a property of an image component of interest.

The method may also comprise selecting a point in the image and processing the image with a plurality of filters, respective filters having a different angular aspect, to produce a plurality of intermediate data structures, and measuring a local phase for the selected point from the intermediate data structures for respective filter angles.

The magnitude of the intermediate data structure produced by processing the image with a filter may depend on the angle of the filter. For example, if a ridge-like structure is convolved with a ridge filter in a direction that is perpendicular to the ridge, there may be a large magnitude at a point in the intermediate data structure corresponding to the ridge. Conversely, if a ridge-like structure is convolved with a ridge filter in a direction that is parallel to the ridge, there may be a small magnitude at a point in the intermediate data structure corresponding to the ridge.

By determining the local phase at a selected point for a plurality of different angles of filters it may be possible to build a profile of the local phase with respect to filter angle. The profile of the local phase with respect to filter angle may be compared with pre-stored local phase profiles produced by known structures so that an image component can be identified. Thus, if the profile of the local phase with respect to filter angle is determined for structures such as hemorrhages and exudates, the shape of the image structure will be represented in the local phase profile.

The method may also comprise formatting the image around the selected point. In one example, it may be appropriate to consider merely the portion of the image that immediately surrounds the selected point. Thus, the image may be cropped so that the selected point is at the center of a region of predetermined dimensions. The cropped image may then be processed with a plurality of filters that may have the same dimensions, for example.

The method may also comprise selecting a plurality of points in the image and measuring the local phase at respective filter angles for respective selected points. Thus, it may be possible to analyze respective points or pixels in an image in order to determine whether there are any image components corresponding to known structures, for example. This method may be particularly useful for detecting structures that have circular aspects such as cotton wool spots in images of the fundus of the eye, for example.

In one embodiment, the image is the image of the fundus of an eye, and the image components of interest are one or more features in the eye.

Any method features may be provided as apparatus features and vice-versa.

FIGURES

Various aspects of the teachings of the present disclosure, and arrangements embodying those teachings, will hereafter be described by way of illustrative example with reference to the accompanying drawings, in which.

DESCRIPTION

In one embodiment the teachings (e.g., methods) of the present disclosure are implemented in software, but it will be appreciated by persons of ordinary skill in the art that the teachings of the disclosure could readily be implemented in hardware (for example in one or more application specific integrated circuits (ASICs)), or indeed in a mix of hardware and software. Accordingly, the following detailed description should not be read as being limited only to being implemented in software.

Figure 1:
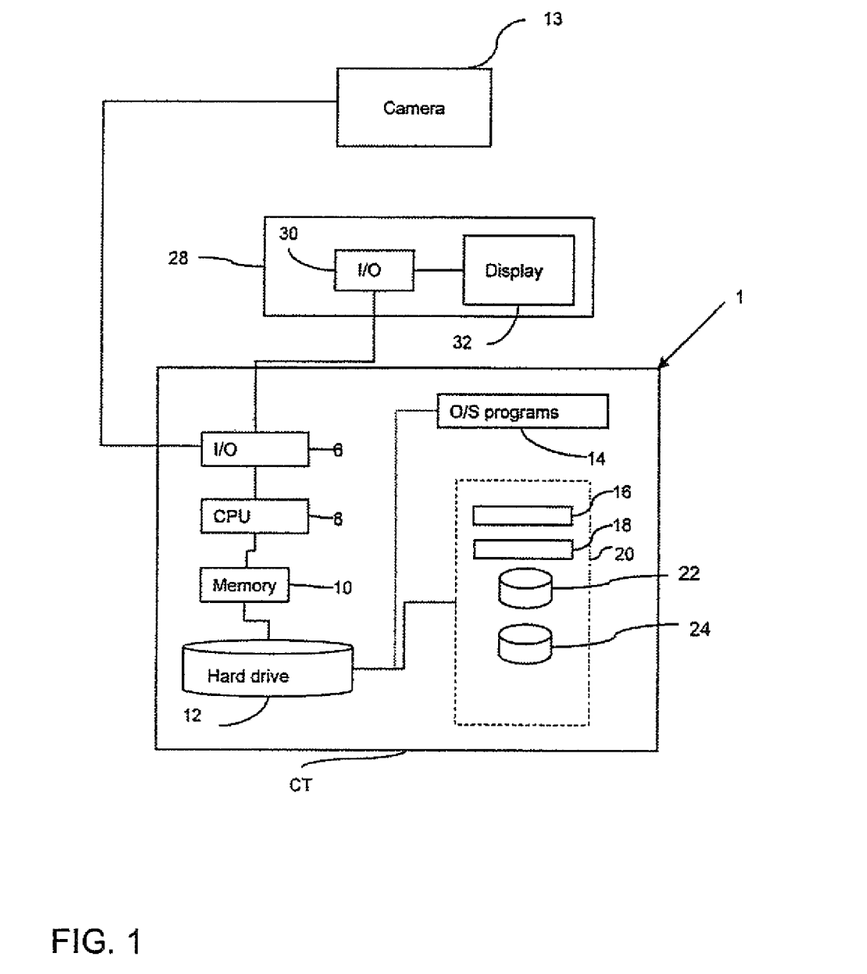
FIG. 1 is an illustrative representation of an image processing apparatus according to one embodiment.

As aforementioned, in one embodiment the method is performed by computer software which the image processing apparatus is arranged to run. The computer software may be stored on a suitable data carrier such as a compact disc (CD). FIG. 1 shows schematically apparatus 1 arranged to perform a method of the disclosure. The apparatus 1 comprises a computer terminal CT which comprises a central processing unit (CPU) 8, memory 10, a data storage device such as a hard disc drive 12 and I/O devices 6 which facilitate interconnection of the computer CT with an optional image capture device such as a camera 13 arranged to record image data. Alternatively, the CT may be arranged to receive image data from a remote or local image data source such as an image database, for example a database maintained in storage.

The I/O devices 6 further facilitate interconnection of a display element 32 of a screen 28 via a screen I/O device 30. Operating system programs 14 are stored on the hard disc drive 12 and control, in a known manner, low level operation of the computer terminal CT. Program files and data 20 are also stored on the hard disc drive 12, and control, in a known manner, outputs to an operator via associated devices and output data stored on the hard disc drive 12. The associated devices comprise the display 32 as an element of the screen 28, a pointing device (not shown) and keyboard (not shown), which receive input from, and output information to, the operator via further I/O devices (not shown). Comprised in the program files 20 stored on the hard disc 12 is a database 22 for storing image data and data related to the image data, including data related to the characteristics described further below, and a database 24 for storing data related to the template data, including the template data.

In very general terms, the teachings of one embodiment implement and supplement elements of a technique that has previously been proposed (for a different purpose) in "A Steerable Complex Wavelet Constructions and Its Application to Image Denoising", A. Bharath and J. Ng, IEEE Transactions on Image Processing. 14(7):948-959, July 2005, the contents of which are included herein by reference. Moreover, the orientation and phase measurements implemented by aspects of the teachings of the disclosure can be obtained from many other complex (quadrature) steerable filter pyramids, for example those described in "The Design and Use of Steerable Filters", W. Freeman and E. Adelson, IEEE Transactions on Pattern Analysis and Machine Intelligence, 13(9): 891-906, September 1991, the contents of which are also included herein by reference.

Figure 2:
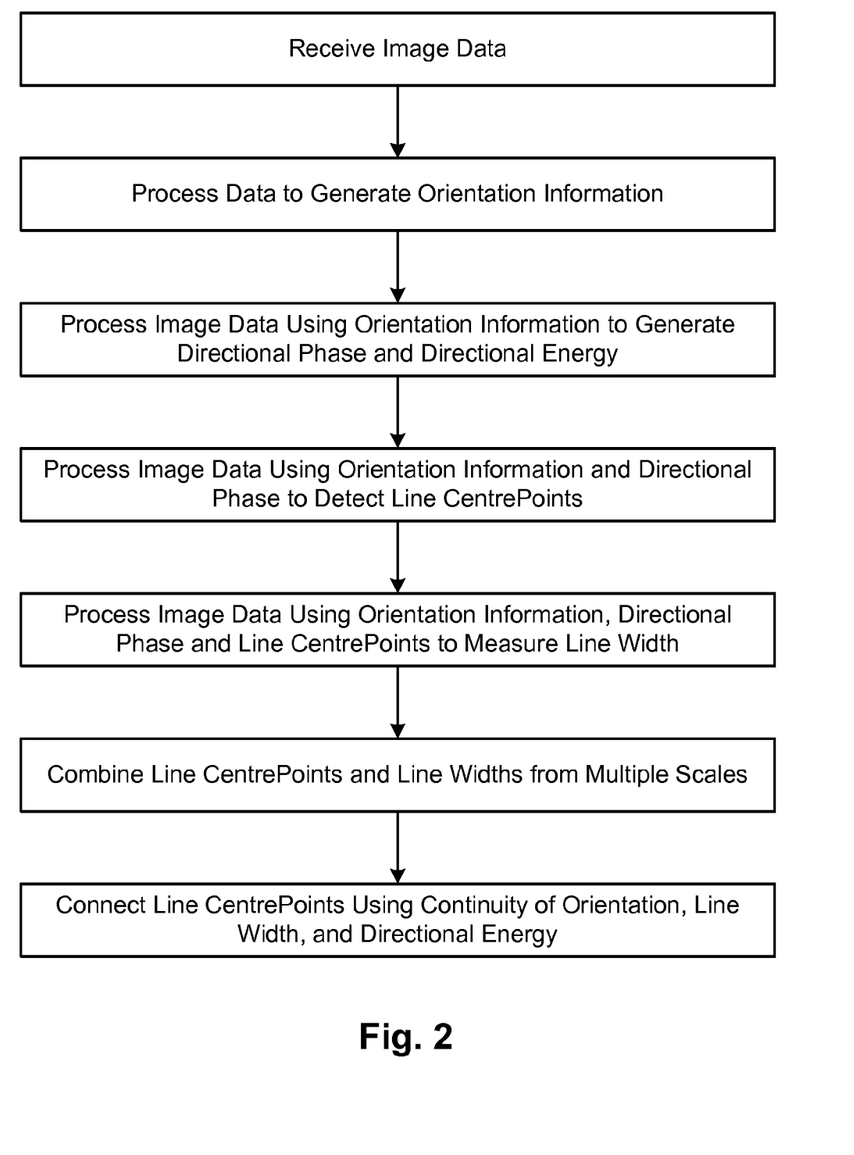
FIG. 2 is an illustrative flow diagram outlining processing acts of a method in accordance with one embodiment.

Referring now to FIG. 2 of the accompanying drawings, in a first act of an implementation of a method according to the teachings of the present disclosure image data is received by a processor of an image processing system. The image data may be received from storage, or be live image data—for example from a retinal camera arranged to capture images of a subject's eye.

The received image data is processed to generate orientation information (for example in the manner described in PCT/EP2007/058547), and then reprocessed using the orientation information to generate information concerning directional phase and directional energy.

In a next act of the process, the orientation information and directional phase is used to determine center-points of image components that are likely to correspond to blood vessels on the retina of the eye. The orientation information, directional phase, and/or line center-points may then, in one embodiment, be utilized to measure the width of the image components that are likely to correspond to blood vessels on the retina of the eye.

These acts may be repeated for multiple scales, and then the center-points may be connected one to the other to provide a visual indication of the blood vessels detected in the fundus. In one implementation, center-points are connected in such a way that continuity of a plurality of features, such as orientation, line width, and/or directional energy, are maintained, for example.

Figure 3:
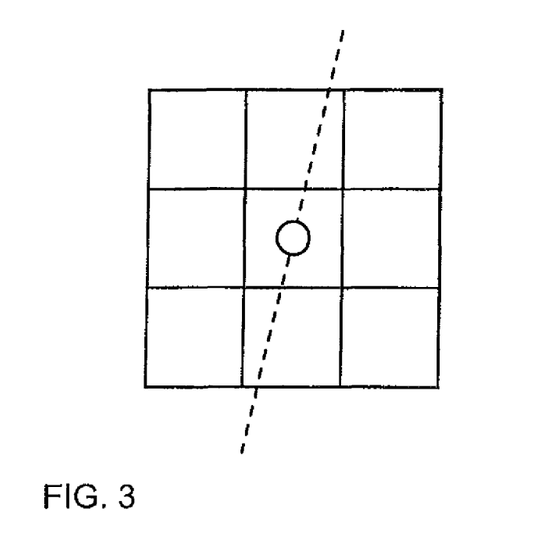
FIG. 3 is a schematic representation of a first technique.

Referring now to FIG. 3, in one embodiment, the orientation (represented by the dotted line) of a candidate image component is measured at a center pixel location (shown with a circle), either with gradient operators or steerable filters.

In one implementation, a pair of pixel locations is chosen, one on either side of the line described by the orientation and closest in orientation to its perpendicular. The center pixel location is detected as a center-point if its local phase is closest to 0 or 180, depending of the polarity of vessel (light vessel on dark background, or dark vessel on light background respectively) of the three pixels and the phases along the line of three pixels are either increasing or decreasing.

In another embodiment, a pair of pixel locations with a minimum deviation of measured orientations is chosen. The local phase is measured in the same direction as either of the two orientations or their average. If the two measured phases lie on either side of 0 or 180, a vessel center-point is detected in between the pixels $p_1=(x1, y1)$ and $p_2=(x2, y2)$ and phases $\phi 1$ and $\phi 2$ and its location is given by:

for detecting a phase of 0
$$p_1 + \frac{|\Phi_1|}{|\Phi_1 - \Phi_2|}(p_2 - p_1)$$

for detecting a phase of 180
$$p_1 + \frac{180 - |\Phi_1|}{360 - |\Phi_1 - \Phi_2|}(p_2 - p_1)$$

Figure 4:
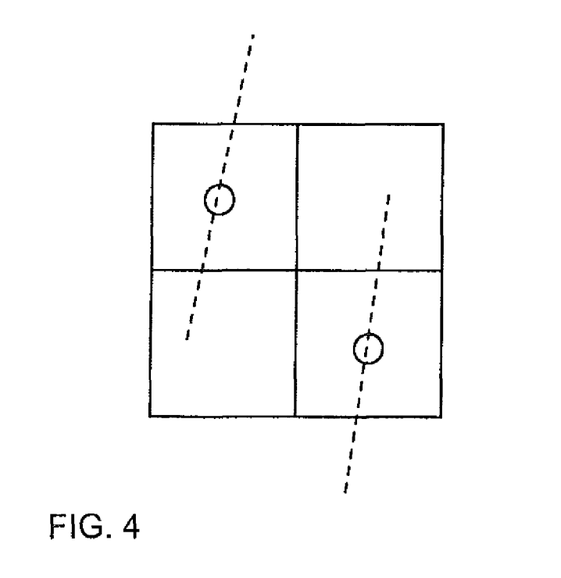
FIG. 4 is a schematic representation of a second technique.

As described in FIG. 4, the pairs of pixel locations can, for example, be taken either as adjacent horizontal, diagonal, and/or vertical pixels. Pairs of non-adjacent pixel locations can also be used, for example.

Local phase measurements either in pairs and/or more along a collinear line may be used as data to fit models of expected phase along the profile of vessels with different widths. A model of a vessel, of a given width and of a given profile of a plurality of image features, can be built by measuring the phase at multiple locations along the profile and learning a function of the phase with respect to distance along the profile. A generic model of phase given distance along profile, width, and profile characteristics (e.g., single peak Gaussian, or double peak separated by a small trough) can be built in this manner. The model with the best fit may be selected, for example.

Figure 5:
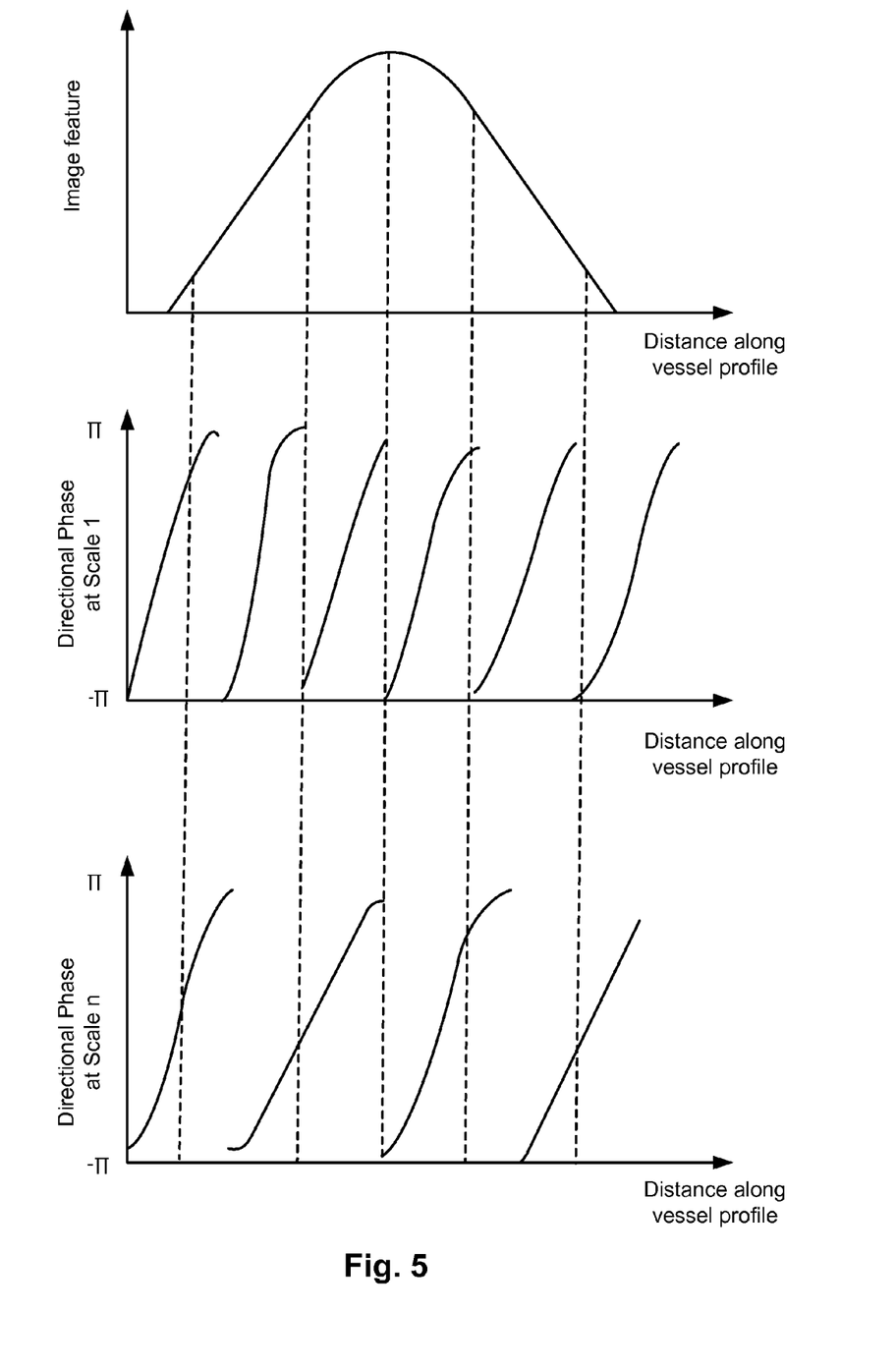
FIG. 5 is a schematic representation of an image feature, directional phase variations at a first scale, and directional phase variations at an n'th scale.

Referring now to FIG. 5, image measurements extracted by image processing filters such as orientation, phase and contrast, are measured over multiple scales (e.g., multiple filter sizes) at the same location. In one aspect, the center-points and morphological measurements from all scales can be used. In another aspect, the center-points and morphological measurements at the scale with the highest isotropic contrast, highest directional contrast perpendicular to the orientation of the vessel, either unnormalized or normalized to the total contrast of the directional measurements in the filter bank can be used.

The center-points with below a threshold difference in measured width, orientation, and/or contrast are linked together so that the vessel network of the retina can be traced.

By virtue of this arrangement it is possible to quickly and accurately map blood vessels within the fundus, and furthermore to provide accurate measurements of the vessels found, for example.

EXAMPLE 1

Figure 6:
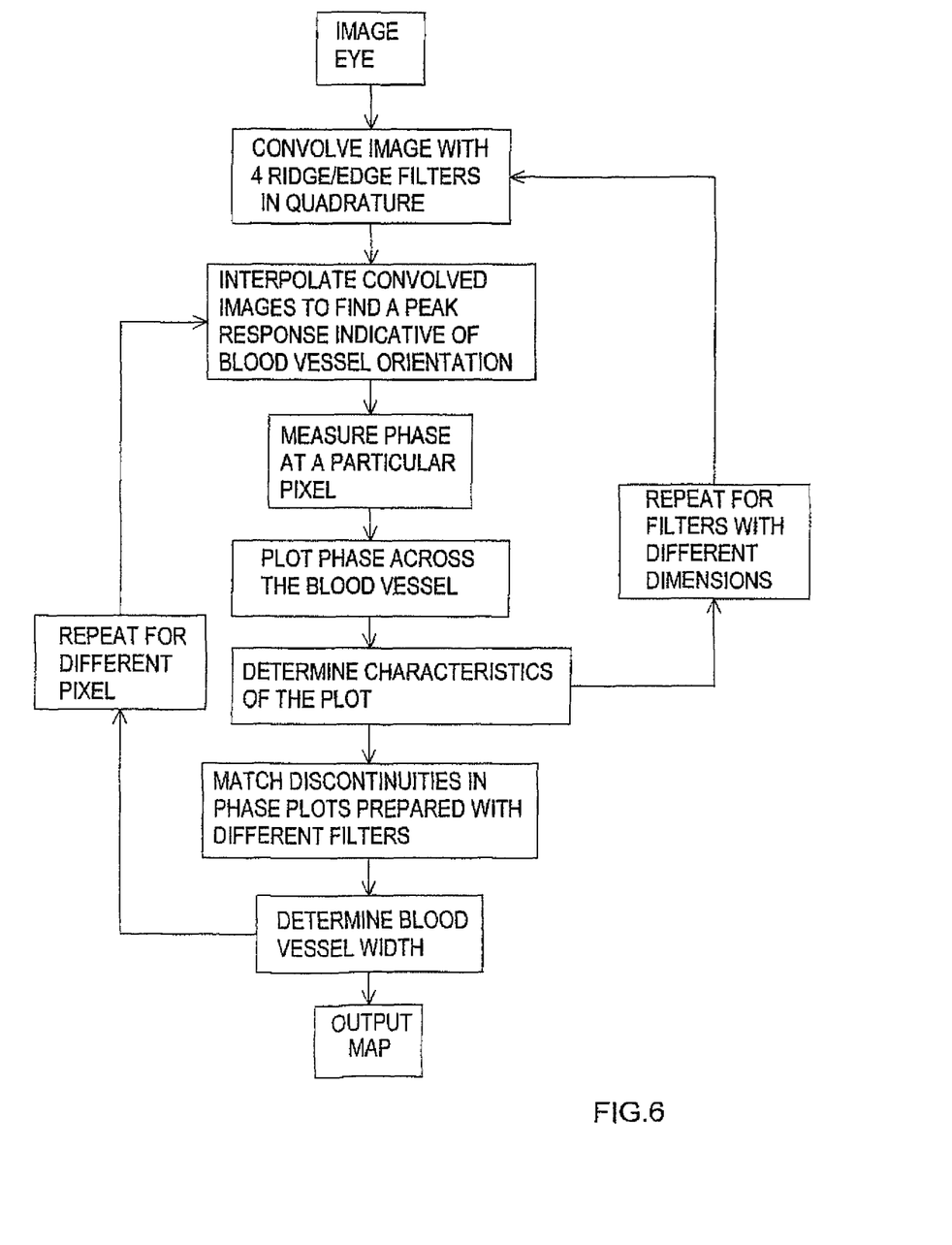
FIG. 6 is a flow diagram showing a sequence of acts to be undertaken in one embodiment.

A specific example of an embodiment will now be described with reference to FIG. 6, which is a flow diagram showing a sequence of acts to be undertaken. The method described relates to the detection of blood vessels in an image of the fundus of the eye.

Figure 9:
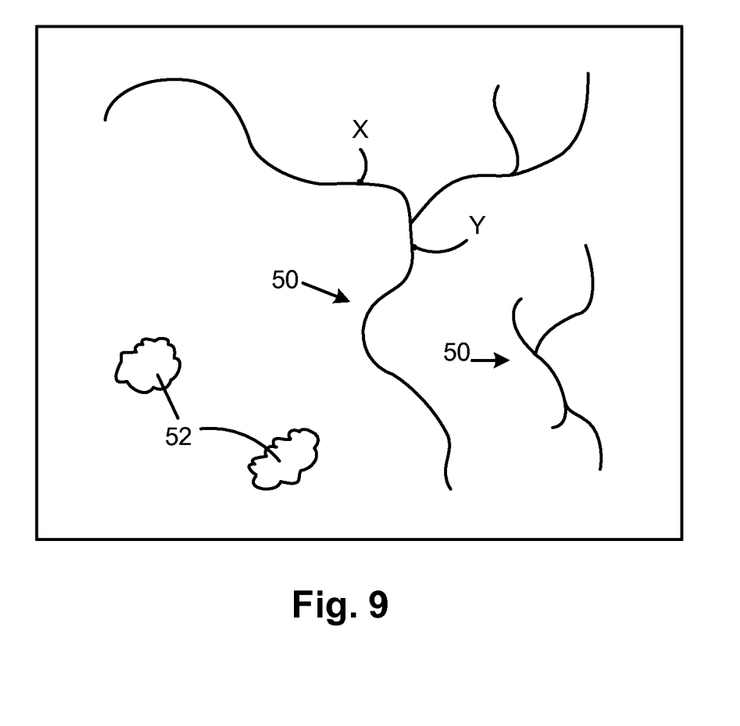
FIG. 9 is a sketched example of an image of the fundus of an eye.

The first act in the process is to image the eye. In this case a digital image is created with 4096×4096 pixels. A sketched example of the digital image is shown in FIG. 9. The image comprises a network of blood vessels 50 and other features including cotton wool spots 52.

The image is analyzed by the processor 8 in the computer terminal CT. In particular, the processor 8 convolves the image mathematically with a set of four ridge filters and with a set of four edge filters. The convolved images are analyzed at the location of respective pixels in the image to determine whether there are any candidate blood vessels present, and what orientation any detected blood vessels possess.

Figure 7A:
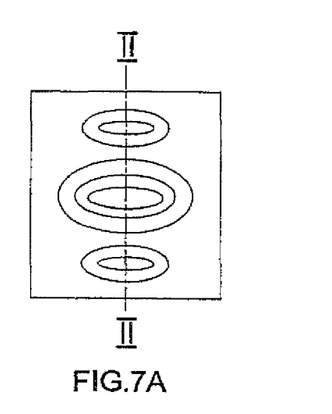
FIGS. 7A and 7C to 7E are schematic plan views of ridge filters in different orientations showing the amplitude of the filters with contour lines.
Figure 7B:
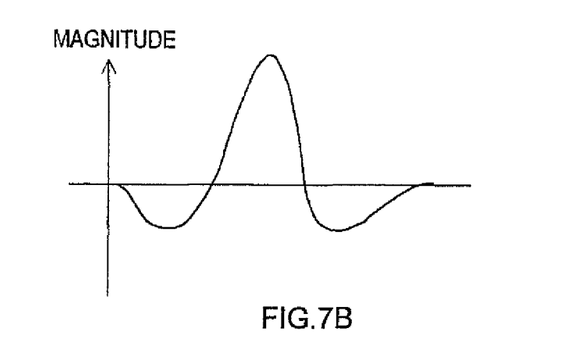
FIG. 7B is a plot of the amplitude profile of a ridge filter taken through line II shown in FIG. 7A.
Figure 7C:
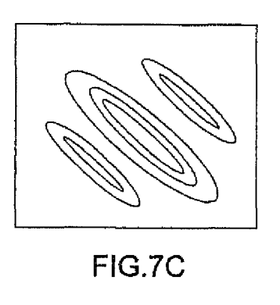
Figure 7D:
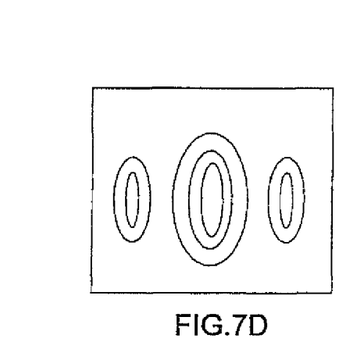
Figure 7E:
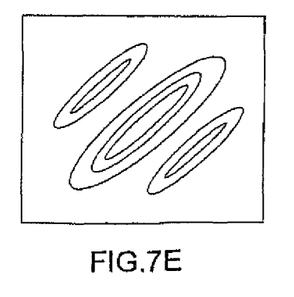
Figure 8A:
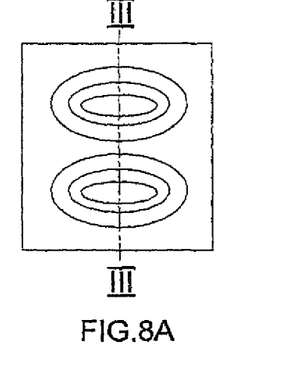
FIGS. 8A and 8C to 8E are schematic plan views of edge filters in different orientations showing the amplitude of the filters with contour lines.
Figure 8B:
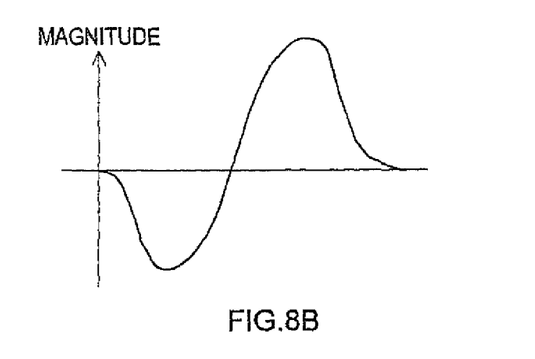
FIG. 8B is a plot of the amplitude profile of an edge filter taken through line III shown in FIG. 8A.
Figure 8C:
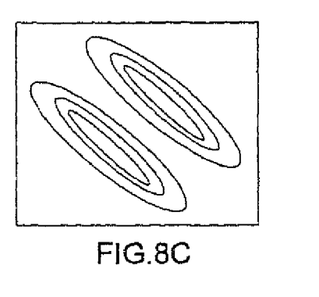
Figure 8D:
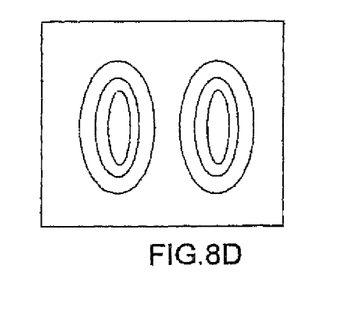
Figure 8E:
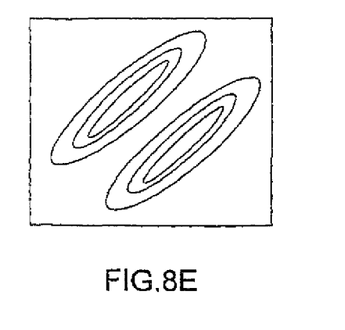

The ridge filters and edge filters are provided at angles of 0°, 45°, 90° and 135° (relative to the nominal vertical axis of the image). FIG. 7A is a schematic plan view of a ridge filter at an angle of 0° to the vertical showing the amplitude of the filter with contour lines. FIG. 8A is a corresponding schematic plan view of an edge filter. The ridge filters comprise a positive central peak and negative side lobes with smaller magnitude, as can be seen in FIG. 7B, which is a profile of the amplitude of the ridge filter along a vertical line II through the center of the filter shown in FIG. 7A. The edge filters comprise two peaks of equal magnitude situated next to one another. One peak is positive and one peak is negative, as can be seen in FIG. 8B, which is a profile of the amplitude of the edge filter along a vertical line III through the center of the filter shown in FIG. 8A. FIGS. 7C to 7E show schematic plan views of the ridge filter at angles of 45°, 90° and 135° respectively. FIGS. 8C to 8E show schematic plan views of the edge filter at angles of 45, 90° and 135° respectively.

The edge filters and ridge filters comprise 4096×4096 pixels so that they are respectively the same size as the image under analysis. The data structure produced by the convolution of the image with a filter (otherwise known as the convolved image) also has a size of 4096×4096 pixels. The magnitude of the convolved image at respective pixels depends on structures in the image and the filter and their relative orientation.

A convolved image has a relatively high magnitude at a position corresponding to a position in the image where there is a blood vessel, where the filter used in the convolution is orientated perpendicularly to the blood vessel. For example, at point X, as shown in FIG. 9, a high magnitude would be obtained for the convolved image produced using a filter at an angle of 0° to the vertical (e.g., the ridge filter shown in FIG. 7A or the edge filter shown in FIG. 8A). At point Y as shown in FIG. 9 a high magnitude would be obtained for the convolved image produced using a filter at an angle of 90° to the vertical (e.g., the ridge filter shown in FIG. 7D or the edge filter shown in FIG. 8D). The processor 8 is arranged to analyze the respective eight convolved images to determine the angle of filter that produces the highest magnitude at respective points. The orientation of the blood vessel is, of course, perpendicular to the angle of the filter that produces the highest magnitude in the convolved image.

If the orientation of the blood vessel is not exactly 0°, 45°, 90° or 135° to the vertical it is still possible to estimate its orientation accurately by interpolating between the results of the convolutions at four different angles. In this way it is possible to search for the filter angle that would provide the highest magnitude in a convolved image at the position of the blood vessel, for example. The orientation of a blood vessel as determined using ridge filters may be slightly different to the orientation of a blood vessel determined using edge filters, and averaging may be used to account for any difference.

The processor 8 uses the convolved images to interpolate the magnitude of a convolved image that would be produced by a filter at an angle that is perpendicular to the blood vessel. The value of the convolved image at the location of the blood vessel is given by the value b for the convolved image produced by the ridge filter and by the value a for the convolved image produced by the edge filter. The local phase is given by the expression $\tan^{-1}(b/a)$. The processor 8 determines local phase for several pixels in a line through the blood vessel in a direction that is perpendicular to the orientation of the blood vessel.

The processor 8 is arranged to plot the measurements of local phase, and an example of a plot of local phase is shown in FIG. 5. The top plot in FIG. 5 shows the intensity profile of a blood vessel (in a negative image). The middle plot in FIG. 5 shows the local phase across the blood vessel. As can be seen from FIG. 5, there are several discontinuities in the local phase, and one discontinuity in particular occurs at a position coinciding with the center of the blood vessel. As there are several discontinuities in the local phase, a further measurement may be required to determine which discontinuity coincides with the position of the center of the blood vessel. This is achieved by measuring local phase again, but this time using filters with different dimensions.

The bottom plot in FIG. 5 shows the local phase across the blood vessel, as measured from convolved images produced using filters with smaller dimensions. As can be seen, the bottom plot of FIG. 5 is different to the middle plot of FIG. 5 because it has been produced using filters with different dimensions. However, both plots include a discontinuity in the local phase at a position that coincides with the center of the blood vessel.

The processor 8 is arranged to match the position of discontinuities in the local phase produced by filters with different dimensions. In this way, it is possible to determine the position of the center of a blood vessel. Of course, the position of the discontinuity may occur between pixel locations and therefore the specific location of the discontinuity may be determined by interpolation. In this way, the spatial location and caliber of a blood vessel can be determined with sub-pixel accuracy.

A discontinuity in the local phase occurs specifically where the blood vessel appears dark against a lighter background, such as in an image of the fundus of the eye. For images where a blood vessel appears light against a darker background, such as mammograms, the phase may be zero (or some other specific value) at a position corresponding to the center of the blood vessel.

The processor 8 is arranged to determine other properties of the blood vessel such as its width by analyzing features of the plots of local phase. In particular, the frequency of repetition of the pattern of local phase, and the location of zero point crossings are noted. These features are compared with data stored in the hard disk 12 that are indicative of the features that are expected to be produced in local phase plots by blood vessels with known properties, and in this way properties of the blood vessel are determined.

The processor 8 is arranged to analyze the local phase at the location of respective pixels in the image. In this way, the size, shape and position of respective blood vessels in the image can be determined. As a final act, the processor 8 is arranged to create a map of the network of the blood vessels in the image for output to the display 32.

EXAMPLE 2

Figure 10:
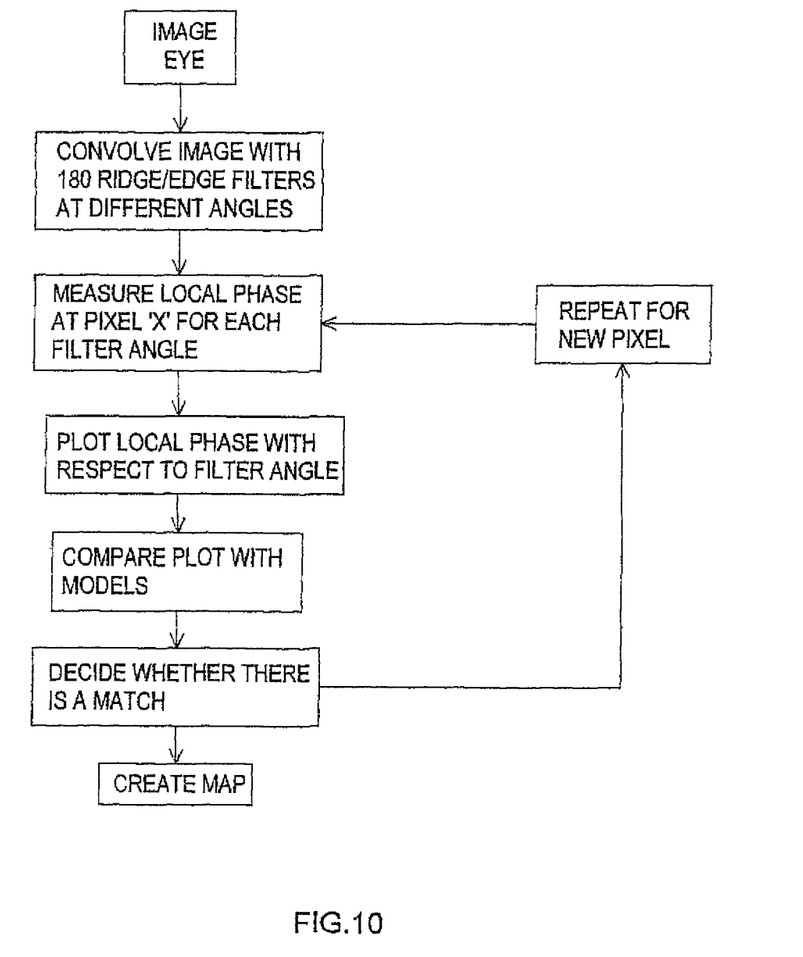
FIG. 10 a flow diagram showing a sequence of acts to be undertaken in one embodiment.

A specific example of an embodiment will now be described with reference to FIG. 10, which is a flow diagram showing a sequence of acts to be undertaken. The method described relates to the detection of cotton wool spots in an image of the fundus of the eye.

As with example 1 the first act in the process is to image the eye, and a sketched example of the digital image with 4096×4096 pixels is shown in FIG. 9.

The processor 8 receives the image of the eye and convolves it with 180 ridge filters and 180 edge filters having angles evenly spaced between 0° and 180°. In this way 180 pairs of convolved images are produced.

The processor 8 is arranged to measure the local phase at a particular point in the image for respective pairs of convolved images. The local phase is measured using the expression $\tan^{-1}$ (b/a) where b is the magnitude of the convolved image produced by the ridge filter and a is the magnitude of the convolved image produced by the edge filter at the relevant point.

The processor 8 is arranged to plot the local phase at the particular point in the image with respect to the angle of the filters that were used to generate the local phase data. Thus, local phase is plotted against filter angle at 180 points.

A characteristic trend is exhibited in plots of local phase against filter angle for points at the center of cotton wool spots. The hard disk 12 is arranged to store a number of characteristic trends that would be created by different shapes of cotton wool spot.

The processor 8 is arranged to compare the plot of local phase produced using the image with the characteristic trends of local phase stored in the hard disk 12 in order to identify possible matches. A series of rules are provided and stored in the hard disk 12 for determining whether a match occurs and the processor 8 makes a match/no-match decision.

The processor 8 undertakes a cotton wool spot analysis for respective points in the image to determine whether that point might be the center of a cotton wool spot. Once the processor has analyzed respective pixels in the image it creates a map of the positions, sizes, and/or shapes of any cotton wool spots for output to the display 32.

It will be appreciated that examples 1 and 2 may be performed in parallel to determine blood vessels and/or cotton wool spots in images of the fundus of the eye. While examples 1 and 2 relate to the detection and measurement of blood vessels and cotton wool spots in images of the fundus of the eye, it will be appreciated that the present disclosure is applicable to the detection of other features in images of the eye (such as hemorrhages and exudates) and/or other features in medical images (such as mammograms). The present disclosure is also applicable to the detection and measurement of features in images that are unrelated to medical imaging.

It will be appreciated that whilst various aspects and embodiments of the present disclosure have heretofore been described, the scope of the present disclosure is not limited to the particular arrangements set out herein and instead extends to encompass all arrangements, modifications and alterations hereto, which fall within the scope of the appended claims.

It should also be noted that whilst the accompanying claims set out particular combinations of features described herein, the scope of the present disclosure is not limited to the particular combinations hereafter claimed, but instead extends to encompass any combination of features herein disclosed.

What is claimed is:

1. A method of analyzing images comprising:
   processing an image with at least one filter to produce at least one intermediate data structure;
   measuring local phase from the at least one intermediate data structure to create a plurality of measurements of local phase;
   analyzing the plurality of measurements of local phase in order to identify an image component of interest, the plurality of measurements of local phase defining a path that is substantially perpendicular to an orientation of a candidate image component of interest; and
   identifying a property of the image component of interest by determining at least one characteristic of the local phase along the path that is substantially perpendicular to the orientation of the candidate image component of interest.

2. The method of claim 1, processing the image comprising convolving the image with the at least one filter to produce the at least one intermediate data structure.

3. The method of claim 1, processing the image comprising processing the image with a plurality of filters to produce a plurality of intermediate data structures.

4. The method of claim 1, at least one filter comprising an edge filter component and a ridge filter component.

5. The method of claim 1, where local phase is measured using the expression $\tan^{-1}(b/a)$, where b and a are components of the at least one intermediate data structure.

6. The method of claim 1, comprising processing the image to generate orientation information about the candidate image component of interest.

7. The method of claim 6, the orientation information generated by processing the image with a plurality of filters respectively having a different angular aspect.

8. The method of claim 6, the image processed with at least one filter to produce at least one intermediate data structure having properties that are representative of processing with a filter having an angular aspect that is substantially perpendicular to the orientation of the candidate image component of interest.

9. The method of claim 1, comprising determining a property of the image component of interest by fitting the measurements of local phase along the path to predicted measurements of local phase for known structures.

10. The method of claim 1, processing the image comprising processing the image with a plurality of filters having different dimensions to produce a plurality of intermediate data structures so that a plurality of measurements of local phase can be determined for each of the filter dimensions.

11. The method of claim 10, comprising matching a characteristic of the plurality of measurements of local phase determined for respective filter scales in order to identify a property of an image component of interest.

12. The method of claim 1, wherein the image is the image of the fundus of an eye, and the image component of interest is at least one feature in the eye.

13. A method, comprising:
   receiving image data representing an image;
   processing the received image data to generate orientation information;
   processing the received image data using the orientation information to measure a local phase in a direction perpendicular to an orientation of a putative vessel; and
   using the local phase measurements from at least one of three collinear image locations or two locations to detect a centerline of a symmetric image structure and to locate a center-point defined by an intersection of the centerline with a line created by the measurement locations.

14. A method for automatically analyzing images for image components of interest, comprising:
   processing image data to determine orientation information for image components;
   obtaining data representative of local phase in a direction perpendicular to an orientation of the image components; and
   utilizing phase measurements from a plurality of candidate image locations to identify an image component of interest.

15. The method of claim 14, comprising determining phase characteristics of image components of interest.

16. The method of claim 15, comprising fitting models of the phase characteristics of a known vessel profile to the phase measurements.

17. An apparatus configured to automatically implement the method of claim 1.

18. A computer program, stored on a computer-readable memory and implemented at least in part via a processing unit, comprising one or more computer program elements that are configured, when executed, to implement one or more acts of the method of claim 1.

19. A method of analyzing images, comprising:
- selecting a point in an image and processing the image with a plurality of filters, respective filters having a different angular aspect, to produce a plurality of intermediate data structures;
- measuring a local phase for the selected point from the intermediate data structures for respective filter angles and creating a plurality of measurements of local phase; and
- comparing the plurality of measurements of local phase with respect to filter angle to a plurality of characteristic profiles of local phase with respect to filter angle in order to identify a match corresponding to an image component of interest.

20. The method of claim 19, comprising selecting a plurality of points in the image and measuring the local phase at respective filter angles for respective selected points.

21. A method of analyzing images comprising:
- convolving an image with a plurality of filters to produce a plurality of intermediate data structures;
- measuring local phase from the plurality of intermediate data structures to create a plurality of measurements of local phase;
- analyzing the plurality of measurements of local phase in order to identify an image component of interest, the plurality of measurements of local phase defining a path that is substantially perpendicular to an orientation of a candidate image component of interest; and
- identifying a property of the image component of interest by determining at least one characteristic of the local phase along the path that is substantially perpendicular to the orientation of the candidate image component of interest.

* * * * *